Nov. 29, 1949     L. J. MENGES     2,489,918
PROCESS AND APPARATUS FOR TREATING MEAT
Filed Jan. 7, 1947
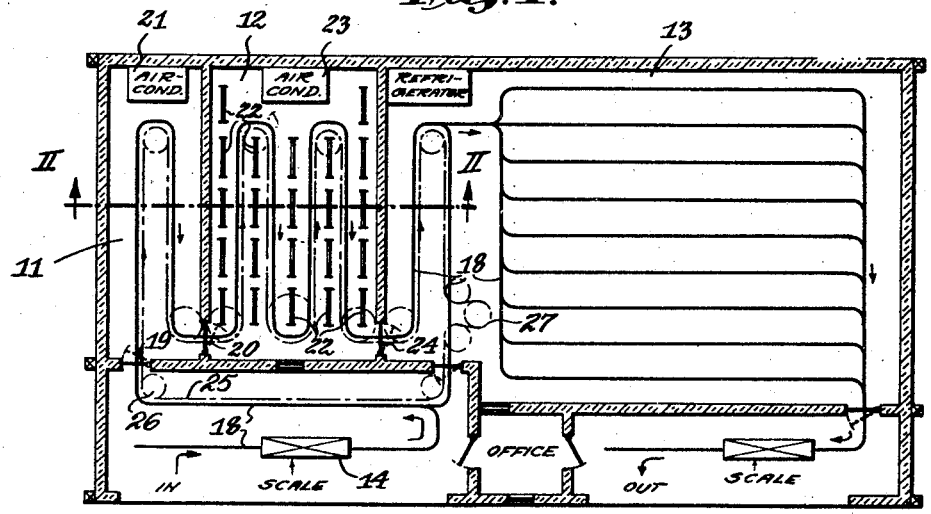
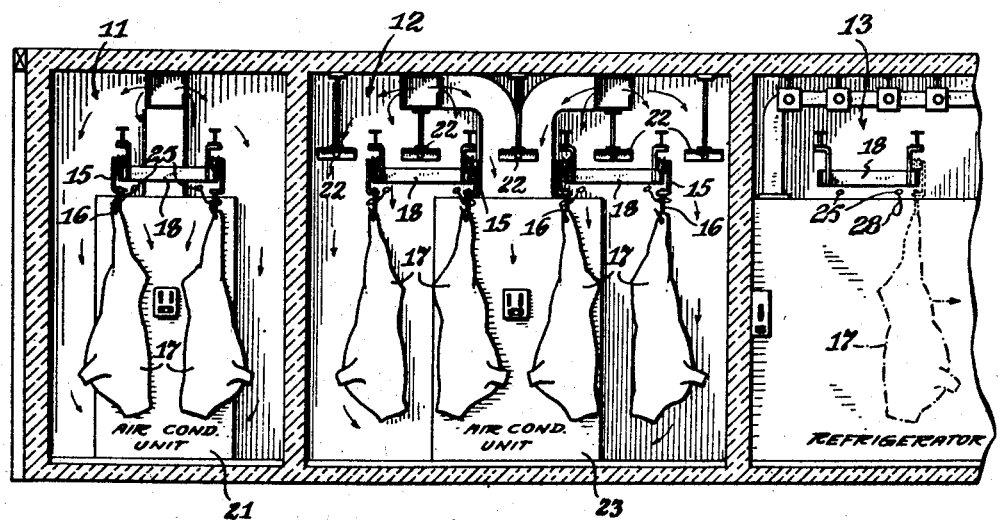
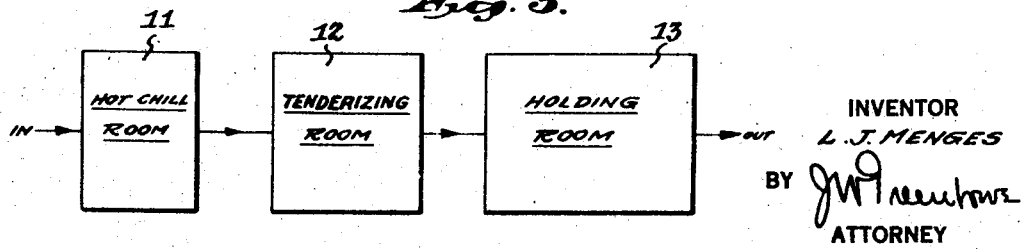
INVENTOR
L. J. MENGES
BY
ATTORNEY Patented Nov. 29, 1949

2,489,918

UNITED STATES PATENT OFFICE 2,489,918

PROCESS AND APPARATUS FOR TREATING MEAT

Louis John Menges, Basking Ridge, N. J., assignor to Westinghouse Electric Corporation, East Pittsburgh, Pa., a corporation of Pennsylvania Application January 7, 1947, Serial No. 720,596

18 Claims. (Cl. 99—194)

This application is a continuation-in-part of my application, Ser. No. 444,945, filed May 29, 1942, and entitled "Method and apparatus for treating meat, now abandoned."

This invention relates to the treatment of food and, more particularly, to an improved method and apparatus for tenderizing meat, following generally the teachings of the James Patent No. 2,169,081, dated August 8, 1939.

The principal object of my invention, generally considered, is the treating of meat and especially beef to improve the quality thereof, as by tenderizing while at the same time avoiding the hitherto-considered-necessary step of severely chilling said meat prior to the tenderizing operation, and/or effecting such tenderization in a shorter time than was heretofore thought possible.

Another object of my invention is to provide a method for quickly tenderizing meat which avoids the previously considered necessary step of reducing the temperature of said meat to a low degree, while at the same time avoiding "bone sour" which sometimes occurs when the meat is not chilled prior to tenderization.

A further object of my invention is to effect tenderization of meat in a much shorter time than heretofore thought possible.

A still further object of my invention is to simplify the process of tenderizing meat by eliminating the initial low degree chilling, the subsequent considerable warming to a tenderizing temperature, thereby shortening the time of tenderizing treatment.

An additional object of my invention is provision of apparatus for conveniently practicing my improved tenderizing method.

Other objects and advantages of the invention, relating to the construction and arrangement of the various parts, will become apparent as the description proceeds.

In the drawings:

Fig. 1 is a plan of a building or suite of rooms or compartments for cooling, tenderizing and holding beef or other meat in accordance with my invention.

Fig. 2 is a vertical sectional view on the line II—II of Fig. 1, in the direction of the arrows.

Fig. 3 is a flow diagram indicating graphically how meat is treated in accordance with my invention.

In the James patent, No. 2,169,081, dated August 8, 1939, previously referred to, there is disclosed and claimed a process for the treatment of meat in order to tenderize the same at an increased speed while, at the same time, avoiding the development of bacteria and mold on the surface of said meat. It is essentially for accelerating the rate at which natural tenderness is produced in beef by hanging. Formerly, this operation required several weeks. The increased tenderness results from the digestive action of naturally-contained enzymes upon the muscular and connective tissues in the meat. This action continues while the carcass is in storage, the speed of the action depending on the storage temperature. It is speeded up by raising the temperature. The process of said patent has proved very successful and the apparatus disclosed therein and in the James patent, No. 2,192,348, dated March 5, 1940, may be successfully employed for the purpose.

However, when meat in large pieces and/or on a large scale is tenderized by a continuous process, that is, when cold meat, as when taken from a refrigerator car, is introduced into a warm humid meat-treatment compartment, (while meat treated for a sufficient length of time to cause the desired tenderization thereof may be removed from another part of said compartment), there is difficulty encountered because of the low temperature of said meat. In accordance with physical laws, there would naturally occur a condensation of moisture on the surface of the cold meat. It was, prior to my invention, thought necessary to use for tenderization only meat which had been chilled to a temperature near freezing to remove its "animal" heat, so that when introduced into the tenderizing compartment its exterior temperature might be as low as 40° F. and its interior temperature as low as 35° F.

Such a situation was highly undesirable, as even thin films of moisture will lead to a certain loss of the natural "bloom" of meat such as beef. In large quantities this condensation will sometimes accumulate in drops and run down the beef, leaving unsightly streaks. Where drops accumulate but do not run unsightly spots result. Any long exposure to heavy condensation will produce effects beyond discoloration and lead ultimately to the development of undesirable odors on the fat of beef, or other meat, as well as accentuate and accelerate the activity of micro-organisms which might be present, and which require moist conditions for their development.

Various means have been tried to eliminate the formation of moisture but it was thought that this could not be done without special means for the purpose, because of the idea that meat could not be satisfactorily tenderized without first removing the "animal" heat, because of the "bone sour" which had developed when tenderization of the animal without first chilling was tried.

The Christensen application, Serial No. 493,227, filed July 2, 1943, now Patent No. 2,419,119, dated April 15, 1947, discloses one method of avoiding the condensation of moisture, that is, by having special apparatus which temporarily increases the temperature and reduces the relative humidity when cold meat is first introduced into the tenderizing compartment.

The Menges abandoned application, Serial No. 358,050, filed September 24, 1940, discloses a method of avoiding the condensation of moisture on meat, by effecting only a very gradual change in the temperature of the air around the meat to be tenderized.

In both of said instances, however, it is proposed to treat meat received in a near-freezing condition or chilled to between 35° and 40° F., to remove the "animal" heat to the extent then thought necessary.

In accordance with my invention I take the freshly slaughtered animal or steer and, instead of chilling it as customary to a temperature between 35° and 40° F. to remove the "animal" heat before tenderizing the same, I cool it to only about 60° F., or more specifically to between about 54° and 59° F., which I have found to be sufficient to avoid "bone sour," and then tenderize the same either at about 55° F. in accordance with the James process patent, previously referred to, or better still increase the speed of tenderization by raising the ambient air temperature to about 70° F., or more specifically 68° F. or near that temperature, whereby adequate tenderization may be effected in two days or less, rather than three or four days, as in accordance with the James patent.

By virtue of my invention I have avoided the loss of time and expense incident to the first previously-thought-necessary chilling of the meat to between 35° and 40° F., the subsequent raising of temperature of the said meat to that required for quick tenderization, in accordance with the James process or higher, thereby further cheapening the process of tenderizing meat, and at the same time providing a just as good or better product than heretofore.

Referring to the drawing in detail, the suite of rooms or compartments illustrated are especially useful for an operator who slaughters as well as treats or tenderizes beef or other meat, that is, where he has the meat before it has been refrigerated or chilled to between 35° and 40° F. If he receives the meat in a refrigerated or chilled condition, some of the advantages of the present invention may not be secured, because the necessity for raising the temperature of the meat to a degree suitable for tenderization is thus not avoided.

In accordance with my invention, there are provided at least three rooms for carrying out the steps of my process; first, the "hot chill" or cooling room designated by the reference character 11, second the "tenderizing" room designated by the reference character 12, and third, the refrigerator or "holding" room designated by the reference character 13. Preferred steps in my method consist in first taking the freshly slaughtered animal, as after weighing on a scale 14 and moving it as by means of a carriage 15, that has a hook 16 from which the animal or part thereof 17 is suspended and which travels on a track 18, into the cooling room 11 as through a door 19.

In this room the air temperature is maintained, as by air conditioning means 21, so that in a desired length of time, preferably 24 hours or less, the temperature of the animal or piece of meat 17 is reduced to about 60° F., or more specifically to within the range of 54° to 59° F. This cooling avoids the formation of "bone sour," as might occur if the freshly killed animal or part thereof, prior to any substantial cooling, were introduced directly to the tenderizing compartment 12. Although desirable, it is not necessary that the animal or meat be either protected by ultraviolet radiation or the maintenance of very high humidity in the compartment 11, because not sufficient time elapses therein for the development of bacteria and/or mold to any appreciable extent, or the occurrence of much loss of moisture or "shrinkage." However, the air temperature and circulation is such that the specified cooling occurs.

When the animal has been sufficiently cooled, as specified, it is transferred as by moving along the rail 18 to the tenderizing room 12, as through door 20. In this room the meat stays a length of time necessary to effect the desired tenderization as in accordance with the James patent, No. 2,169,081, previously referred to, while protected by radiation from ultraviolet lamps 22 disposed thereabove for activating the air and inhibiting the growth of bacteria and molds on the surface of the meat.

The temperature and humidity of the tenderizing room may be maintained, as in accordance with the James patent, by means of air conditioning equipment 23, but in accordance with my invention it is preferred to maintain the air at a higher temperature, say about 68° or 70° F., and increase the air circulation, in order that the speed of the tenderization may be increased so that the meat of the desired tenderness is produced in two days or less, rather than in three or four days, as in accordance with the James patent.

As in said James patent the lamps 22 employed are desirably such that they generate radiations mainly in the bactericidal range, that is, between about 2500 and 3000 Angstrom units, with no undesirable proportion of radiations below about 2500 Angstrom units, and in the infra red region. The intensity of the radiations from such lamps, desirably constructed in accordance with the James patent, No. 2,258,765, of October 14, 1941, may be regulated by the current therethrough so that the radiations generated inhibit the growth of fungi and bacteria without causing rancidity of the fat, or other undesirable effects, within the period required for tenderizing the meat. The small proportion of radiations below 2000 Angstrom units is sufficient to generate enough ozone to protect the surface of the meat not directly exposed to the radiations, as in accordance with the James patent. The humidity is desirably maintained high, say about 80% to 90% relative humidity, in order to avoid appreciable loss of moisture from or shrinkage of the meat.

After the meat has been sufficiently tenderized it is moved as through door 24, into the refrigerator or holding compartment 13 where it is maintained at a normal refrigerating or preserving temperature, preferably about 34° F. to 40° F. or between 36° F. and 40° F., until sold or otherwise disposed of. In this refrigerator the humidity is also desirably maintained high to minimize shrinkage of the meat desirably, but not necessarily, protected by ultraviolet radiations as in the tenderizing compartment.

In the embodiment of my invention illustrated in Figs. 1 and 2, I have shown the tenderizing room 12 approximately double the size of, and containing a length of meat-carrying track 18 approximately twice as long as that in the "hot chill" room 11, because I propose to keep the meat in the tenderizing room approximately double the length of time that it is kept in the "hot chill" room. An advantage of this ratio is that automatic, that is, power as distinguished from manual, means are contemplated for moving the slaughtered animals or meat along the track 18, so that each animal or cut of meat stays in the "hot chill" and tenderizing rooms of the required lengths of time, and is finally distributed in the refrigerator or holding room 13 until disposed of.

This automatic transfer of the meat from one room to another may be gradual or continuous, as by causing the meat carriages 15 to move at uniform speed along the track, as by the employment of a cable 25 passing over pulleys 26 and driven at the desired slow speed by power means 27. The cable may carry hooks, loops, or other means 28 for connecting with the respective meat carriages 15 for moving them so that each supported cut or animal stays in the "hot chill" room and tenderizing room the required lengths of time. As an alternative, a batch of cuts or animals may be cooled in the "hot chill" room while stationary for the required lengths of time and then moved bodily to the adjacent half of the tenderizing room while the batch in the other half of said tenderizing room is moved bodily out into the holding room or refrigerator 13.

There follows detailed rules for practicing my process as developed commercially:

Slaughtering operation

1. Animals should be thoroughly bled.
2. Spinal cords should be completely removed.
3. Animals should be thoroughly and completely washed. It is recommended that pressures of 250–300 lbs./sq. in. be used in the washing operation.
4. Shrouds and shroud pins should be fresh and clean. Shrouds should be laundered between each use. Shroud pins should be sterilized as by boiling for five minutes between each use. Before applying shrouds, it is beneficial to saturate them in a clean solution of warm salt water containing not more than 15% salt by weight.

Cooling operation

1. Place the carcass in the "hot-chill" room 11 and allow to hang until the temperature of the hind quarter, as measured at the center of the round, reaches a range of 54° to 59° F. in a period not to exceed 24 hours, and about 60° F. in from 18 to 20 hours.

Cattle should be properly spaced in the chill room. Sides should be spaced to allow sufficient air circulation and adjacent sides are not to touch. Experience has indicated that a space of 2" to 4" between sides is satisfactory. This practice for spacing should be followed throughout the entire operation.

2. Cattle are now ready to be placed in the tenderizing room 12, after about 24 hours of cooling.

Processing operation

1. The tenderizing room 12 shall have constantly maintained conditions of (a) temperature, (b) relative humidity, (c) ultraviolet radiation, and (d) air velocity. These conditions are to be maintained for a definite period of time.

(a) Temperature is desirably 68° F.

(b) Relative humidity is desirably 80 to 85%. The conditions of relative humidity shall be met with the room empty and again (following sufficient time lapse for the room to return to a specified condition) after loading with beef.

(c) Ultraviolet radiations shall be provided by the use of one 30-inch generator, preferably of the type mentioned, for every 20 sq. ft. of floor space.

It should be understood that while ultraviolet radiation does not effect tenderizing of meat, it is necessary for inhibiting bacterial growth under the climatic conditions of the process. Care should be exercised to see that the efficiency of irradiation is maintained by cleaning the generators and replacing when necessary.

(d) Air velocity shall be 50–75 ft./min. passing all sides of the carcass and measured at a distance of 7' below the hanging rail. This may be measured by an "Alnor Velometer" as manufactured by the Illinois Testing Laboratories, Chicago, Illinois. Fresh air should be constantly drawn into the room at a rate of one air change per hour.

(e) Time: Beef shall be held under these conditions for a period of about 48 hours. Adjustment may be made downward (but preferably only to an absolute minimum of 44 hours) to accommodate an individual plant's labor or delivery schedule. However, each plant should maintain a uniform and constant schedule, for uniformity of product.

Chilling beef for sale and shipment

Cattle shall be chilled to an internal temperature range ( as measured at the center of the round) of 36°–40° in a period of 36–40 hours.

It is generally recognized that refrigerated delivery of meat is highly desirable. While tenderized beef essentially will stand the same delivery handling as regular beef, refrigerated delivery is strongly recommended in areas having high summer temperatures and for packers whose delivery area allows beef to rise in temperature prior to arrival at destination.

Summary

From the foregoing it will be seen that I have devised a method and apparatus for tenderizing beef or other meat, whereby economies are effected as compared with the method disclosed in the James patent referred to, by first avoiding the initial chilling previously thought necessary, second avoiding the necessity for a relatively large increase in temperature to that suitable for tenderization, and third effecting said tenderization at a higher temperature and in a shorter time than previously thought possible without undesirable results.

Although a preferred embodiment of my invention has been disclosed, it will be understood that modifications may be made within the scope and spirit of the appended claims.

I claim:

1. The process of treating meat comprising slaughtering, then cooling during a period not exceeding 24 hours to an internal temperature between about 54° and 59° F., and then tenderizing in air at from about 68° to 70° F. for about two days.

2. The process of treating meat comprising slaughtering, then cooling during a period of about 24 hours to a temperature between about 54° and 59° F., tenderizing in air at from about 68° to 70° F. for about two days, and then refrigerating until disposed of.

3. The process of treating meat comprising slaughtering, then holding during the next 24 hours at a temperature declining to about 60° F. in from 18 to 20 hours, and then tenderizing in air at from about 68° to 70° F. for about two days.

4. The process of treating meat comprising slaughtering, then holding during the next 25 hours at a declining temperature terminating within the range between 54° and 59° F., holding in air at a temperature of 68° F. for about two days, to render said meat tender, while protecting with ultraviolet radiations to inhibit the growth of bacteria and mold, and then holding said meat at an internal temperature lying between about 36° and 40° F.

5. The process of treating meat comprising cooling a freshly slaughtered animal for not more than 24 hours to bring it to an internal temperature within the range between 54° and 59° F., holding it about two days in air at a temperature of about 68° F., while protected by ultraviolet radiations in the bactericidal range, in order to cause the same to become tender, and then refrigerating and holding at a temperature of between about 36° and 40° F.

6. The process of treating meat comprising slaughtering, then holding during the next 24 hours at a declining temperature terminating within the range between 54° and 59° F., holding in air at a temperature of 68° F. for about two in air at a temperature of 68° F. for about two days, to render said meat tender, while protecting with ultraviolet radiations to inhibit the growth of bacteria and mold and maintaining a relative humidity of 80% to 85% and an air velocity along the meat of between 50 and 75 feet per minute, and then holding said meat at an internal temperature lying between about 36° and 40° F.

7. Apparatus for performing a process for tenderizing meat comprising means for cooling meat immediately after slaughtering during a period not exceeding 24 hours to an internal temperature between about 54° and 59° F., means for generating ultraviolet radiations to inhibit the growth of bacteria and mold on, a connected to and indirect communication with said first-mentioned means for increasing the temperature of, said meat to one suitable for tenderizing, and means connected to and in direct communication with said second-mentioned means for holding said meat at a normal refrigerating temperature; whereby such meat may be held in the first means for about 24 hours, then tenderized, and then preserved for use.

8. Apparatus for treating meat comprising three communicating compartments, the first compartment containing air conditioning means for cooling freshly slaughtered meat, during a period not exceeding 24 hours, to an internal temperature between about 54° and 59° F., the second compartment being connected to and in direct communication with said first compartment and containing conditioning means for holding the air therein at about 68° to 70° F., and the third compartment being connected to and in direct communication with said second compartment and containing means for holding said meat at a normal refrigerating temperature; said second compartment being approximately double the size of the first compartment, whereby meat immediately after slaughtering may be held in the first compartment for about 24 hours, then moved directly to and tenderized in the second compartment for about double that length of time, and then moved directly to and refrigerated in the third compartment.

9. Apparatus for treating meat comprising three communicating compartments, means for moving freshly slaughtered meat sequentially through said compartments, means in the first compartment for reducing the temperature of meat during a period not exceeding 24 hours, to an internal temperature between about 54° and 59° F., means in the second comparment for holding said meat for tenderizing purposes in air at a temperature of from about 68° to 70° F., and means in the third compartment for maintaining a normal refrigerating temperature; approximately twice as much of the length of the means for moving the meat lying in the second compartment, as compared with that in the first compartment, whereby freshly slaughtered meat may be held during 24 hours at a declining temperature terminating at between about 54° and 59° F., tenderized in air in the second compartment at from about 68° to 70° F. for about two days, and then preserved in the third compartment.

10. Apparatus for treating meat comprising three communicating compartments, means in the first compartment for cooling meat during 24 hours to a temperature within the range between 54° and 59° F., means in the second compartment for holding said meat in air at a temperature of about 68° F., means in said compartment for also generating ultraviolet radiation, and means in the third compartment for chilling said meat to a temperature lying between about 36° and 40° F., said second compartment being approximately double the size of the first compartment, whereby such meat may be cooled in the first compartment, during the first 24 hours after slaughtering, to a temperature between 54° and 59° F., then tenderized in the second compartment for about two days, and then preserved in the third compartment until disposed of.

11. Apparatus for treating meat comprising three communicating compartments, means in the first compartment for bringing the internal temperature of a freshly slaughtered animal to within the range between 54° and 59° F. during a time period of about 24 hours, means in the second compartment for holding said meat in air at a temperature of about 68° F., maintaining the air at a relative humidity of 80% to 85%, and generating bactericidal ultraviolet radiations, and means in the third compartment for chilling meat to a temperature between about 36° F. and 40° F., said second compartment being approximately double the size of the first compartment, whereby freshly slaughtered meat may be cooled during 24 hours to a temperature between about 54° and 59° F. tenderized in the second compartment during the next 48 hours, and then preserved in the third compartment.

12. Apparatus for treating meat comprising three communicating compartments, the second of said compartments being approximately double the size of the first, a meat carrying track running through the first and second compartments and into the third compartment, the length of the track in the second compartment being approximately double that in the first compartment, and means for continuously moving pieces of meat along said track into and through said compartments, means disposed in said first compartment for cooling freshly slaughtered meat during 24 hours to a temperature within the range between 54° and 59° F., means in the second compartment for holding the air therein at a tenderizing temperature of about 68° F., and means in the third compartment for holding the air therein at a meat preserving temperature; whereby freshly slaughtered meat may be cooled in the first compartment during a period of about 24 hours to a temperature just low enough to avoid "bone sour," then tenderized in the second compartment during a period of about two days, and then preserved in the third compartment.

13. Apparatus for treating meat comprising three communicating compartments, means in the first compartment for cooling freshly slaughtered meat during a period of about 24 hours to an internal temperature between about 54° and 59° F., means in the second compartment for holding its air temperature at about 68° F. and maintaining said air with a relative humidity of 80% to 85%, and circulating at a velocity of between about 50 and 75 feet per minute, means also in said second compartment for generating ultraviolet radiations to inhibit the growth of bacteria and mold, said second compartment being approximately double the size of said first compartment, and means in the third compartment for chilling said meat to between 36° and 40° F., a meat carrying track running through all of said compartments and having about twice as much length in the second as in the first compartment, and means for continuously moving pieces of meat along said track; whereby freshly slaughtered meat may be started along said track, be contained in said first compartment for about 24 hours, then pass on into said second compartment and be tenderized during the period of 48 hours, and then passed to said third compartment to be chilled for preservation.

14. Apparatus for performing a process for tenderizing meat comprising means for cooling meat immediately after slaughtering during a period not exceeding 24 hours to an internal temperature between about 54° and 59° F., and means for generating ultraviolet radiation to inhibit the growth of bacteria and mold on, and connected to and in direct communication with said first-mentioned means for increasing the temperature of, said meat to one suitable for tenderizing, whereby such meat may be held in the first means for about twenty-four hours and then tenderized.

15. Apparatus for treating meat comprising two communicating compartments, means for moving freshly slaughtered meat sequentially through said compartments, means in the first compartment for reducing the temperature of said meat during a period not exceeding 24 hours, to an internal temperature between about 54° and 59° F., and means in the second compartment for holding said meat for tenderizing purposes in air at a temperature between about 68° and 70° F., said second compartment being approximately double the size of the first compartment, whereby the freshly slaughtered meat may be held during 24 hours at a declining temperature terminating at between about 54° and 59° F. and then tenderized in air in the second compartment at a temperature between about 68° F. and 70° F. for about two days.

16. Apparatus for treating meat comprising two communicating compartments, the second of said compartments being approximately double the size of the first, a meat carrying track running through said compartments, the length of the track in the second compartment being approximately double that in the first compartment, and means for continuously moving pieces of meat along said track into and through said compartments, means disposed in said first compartment for cooling freshly-slaughtered meat during 24 hours to a temperature within the range between 54° and 59° F., and means in the second compartment for holding the air therein at a temperature of about 68° F. for desirable tenderizing action, whereby said freshly-slaughtered meat may be cooled in the first compartment during a period of about 24 hours to a temperature just low enough to avoid "bone sour," and then tenderized in the second compartment for a period of about two days.

17. The process of treating meat comprising slaughtering, then holding during the next 24 hours at a temperature declining to about 60° F. in from 18 to 20 hours and terminating in a temperature within the range between about 54° and 59° F., and then tenderizing in air at a temperature between about 68° and 70° F. for about two days.

18. The process of treating meat comprising slaughtering, then holding during the next 24 hours at a declining temperature terminating within the range between about 54° and 59° F., and then holding in air at a temperature of about 68° F. for about two days to render said meat tender, while protecting with ultra-violet radiations to inhibit the growth of bacteria and mold and maintaining a relative humidity of 80% to 85% and an air velocity along the meat of between 50 and 75 feet per minute.

LOUIS JOHN MENGES.

REFERENCES CITED

The following references are of record in the file of this patent:

UNITED STATES PATENTS

| Number | Name | Date |
|---|---|---|
| 1,001,664 | Marshall | Aug. 29, 1911 |
| 1,782,688 | Hoffman | Nov. 25, 1930 |
| 1,955,669 | Botz | Apr. 17, 1934 |
| 2,169,081 | James | Aug. 8, 1939 |
| 2,192,348 | James | Mar. 5, 1940 |
| 2,259,803 | Cummings | Oct. 21, 1941 |
| 2,315,285 | Dennington | Mar. 30, 1943 |
| 2,339,507 | Nagy | Jan. 18, 1944 |
| 2,419,119 | Christensen | Apr. 15, 1947 |

FOREIGN PATENTS

| Number | Country | Date |
|---|---|---|
| 106,865 | Australia | Mar. 23, 1939 |

OTHER REFERENCES

"The Tenderization of Meat," published by the Industrial Fellowship of Meat Merchandizing, Mellon Institute, Pittsburgh, Pa.